United States Patent
Souder et al.

(10) Patent No.: US 11,507,771 B2
(45) Date of Patent: *Nov. 22, 2022

(54) SYSTEMS AND METHODS FOR PALLET IDENTIFICATION

(71) Applicant: BXB Digital Pty Limited, Sydney (AU)

(72) Inventors: Michael Souder, Fremont, CA (US); Daniel Bricarello, San Francisco, CA (US); Juan Castillo, Mountain View, CA (US); Prasad Srinivasamurthy, Saratoga, CA (US)

(73) Assignee: BXB Digital Pty Limited, Sydney (AU)

( * ) Notice: Subject to any disclaimer, the term of this patent is extended or adjusted under 35 U.S.C. 154(b) by 1 day.

This patent is subject to a terminal disclaimer.

(21) Appl. No.: 17/087,351

(22) Filed: Nov. 2, 2020

(65) Prior Publication Data

US 2021/0049405 A1    Feb. 18, 2021

Related U.S. Application Data

(63) Continuation of application No. 15/969,195, filed on May 2, 2018, now Pat. No. 10,824,904.

(Continued)

(51) Int. Cl.
*G06K 9/00* (2022.01)
*G06K 9/62* (2022.01)
(Continued)

(52) U.S. Cl.
CPC ....... *G06K 9/6215* (2013.01); *G06K 9/00523* (2013.01); *G06K 9/00536* (2013.01);
(Continued)

(58) Field of Classification Search
None
See application file for complete search history.

(56) References Cited

U.S. PATENT DOCUMENTS

| 681,428 A | 8/1901 | Ambrose |
| 5,438,607 A | 8/1995 | Przygoda, Jr. et al. |

(Continued)

FOREIGN PATENT DOCUMENTS

| CA | 2185354 | 9/1995 |
| CN | 101809601 | 3/2015 |

(Continued)

OTHER PUBLICATIONS

Anonymous, "Geo-Fence", Wikipedia, Available Online at, URL:https://en.wikipedia.0rg/w/index.php7title=Geofence&oldid=768541623, Mar. 4, 2017, 3 pages.

(Continued)

*Primary Examiner* — Soo Jin Park
(74) *Attorney, Agent, or Firm* — Kilpatrick Townsend & Stockton LLP

(57) ABSTRACT

Provided are methods, including computer-implemented methods, devices, and computer-program products applying systems and methods for pallet identification. According to some embodiments of the invention, a pallet may be visually identified through photographs without attaching physical labels. Thus, the status of pallets may be monitored (e.g., their location and structural integrity) as they move through the supply chain.

20 Claims, 7 Drawing Sheets

Related U.S. Application Data

(60) Provisional application No. 62/500,462, filed on May 2, 2017.

(51) Int. Cl.
  *G06Q 10/08* (2012.01)
  *G06Q 10/06* (2012.01)
  *G06V 10/10* (2022.01)
  *G06V 10/24* (2022.01)

(52) U.S. Cl.
  CPC ....... *G06Q 10/0631* (2013.01); *G06Q 10/087* (2013.01); *G06Q 10/0833* (2013.01); *G06V 10/17* (2022.01); *G06V 10/242* (2022.01)

(56) References Cited

U.S. PATENT DOCUMENTS

| | | |
|---|---|---|
| 5,491,486 A | 2/1996 | Welles, II et al. |
| 5,691,980 A | 11/1997 | Welles, II et al. |
| 5,774,876 A | 6/1998 | Woolley et al. |
| 5,844,482 A | 12/1998 | Guthrie et al. |
| 6,199,488 B1 | 3/2001 | Favaron et al. |
| 6,294,114 B1 | 9/2001 | Muirhead |
| 6,373,389 B1 | 4/2002 | Przygoda, Jr. et al. |
| 6,415,223 B1 | 7/2002 | Lin et al. |
| 6,483,434 B1 | 11/2002 | Umiker |
| 6,600,418 B2 | 7/2003 | Francis et al. |
| 6,661,339 B2 | 12/2003 | Muirhead |
| 6,667,936 B1 | 12/2003 | Ditzig |
| 6,669,089 B2 | 12/2003 | Cybulski et al. |
| 6,700,533 B1 | 3/2004 | Werb et al. |
| 6,707,381 B1 | 3/2004 | Maloney |
| 6,717,517 B2 | 4/2004 | Przygoda, Jr. |
| 6,718,888 B2 | 4/2004 | Muirhead et al. |
| 6,749,418 B2 | 6/2004 | Muirhead |
| 6,814,287 B1 | 11/2004 | Chang et al. |
| 6,900,815 B2 | 5/2005 | Yoshioka |
| 6,934,625 B2 | 8/2005 | Haddad |
| 6,943,678 B2 | 9/2005 | Muirhead |
| 7,026,937 B2 | 4/2006 | Przygoda, Jr. |
| 7,034,683 B2 | 4/2006 | Ghazarian |
| 7,100,052 B2 | 8/2006 | Ghazarian |
| 7,133,704 B2 | 11/2006 | Twitchell, Jr. |
| 7,155,264 B2 | 12/2006 | Twitchell, Jr. |
| 7,173,529 B2 | 2/2007 | Przygoda, Jr. |
| 7,209,771 B2 | 4/2007 | Twitchell, Jr. |
| 7,242,306 B2 | 7/2007 | Wildman et al. |
| 7,252,230 B1 | 8/2007 | Sheikh et al. |
| 7,313,476 B2 | 12/2007 | Nichols et al. |
| 7,336,152 B2 | 2/2008 | Horwitz et al. |
| 7,336,167 B2 | 2/2008 | Olsen, III et al. |
| 7,336,182 B1 | 2/2008 | Baranowski et al. |
| 7,342,496 B2 | 3/2008 | Muirhead |
| 7,365,737 B2 | 4/2008 | Marvit et al. |
| 7,388,492 B2 | 6/2008 | Watanabe |
| 7,398,153 B2 | 7/2008 | Workman et al. |
| 7,400,259 B2 | 7/2008 | O'Connor et al. |
| 7,443,297 B1 | 10/2008 | Baranowksi et al. |
| 7,446,658 B2 | 11/2008 | Panotopoulus |
| 7,564,357 B2 | 7/2009 | Baranowski et al. |
| 7,633,389 B2 | 12/2009 | Montovani et al. |
| 7,656,278 B2 | 2/2010 | Onishi et al. |
| 7,668,596 B2 | 2/2010 | Von Arx et al. |
| 7,735,430 B2 | 6/2010 | Muirhead |
| 7,742,745 B2 | 6/2010 | Twitchell, Jr. |
| 7,752,980 B2 | 7/2010 | Muirhead |
| 7,783,423 B2 | 8/2010 | Verma et al. |
| 7,789,024 B2 | 9/2010 | Muirhead |
| 7,804,400 B2 | 9/2010 | Muirhead |
| 7,874,256 B2 | 1/2011 | Muirhead |
| 7,903,084 B2 | 3/2011 | Marvit et al. |
| 7,948,371 B2 | 5/2011 | Muirhead |
| 7,956,746 B2 | 6/2011 | Truscott et al. |
| 7,963,235 B2 | 6/2011 | Muirhead |
| 7,999,670 B2 | 8/2011 | McClellan et al. |
| 8,036,826 B2 | 10/2011 | MacIntosh et al. |
| 8,041,079 B2 | 10/2011 | Chiu et al. |
| 8,077,040 B2 | 12/2011 | Muirhead |
| 8,095,070 B2 | 1/2012 | Twitchell, Jr. |
| RE43,178 E | 2/2012 | Ghazarian |
| 8,111,157 B2 | 2/2012 | Diener et al. |
| 8,159,338 B2 | 4/2012 | Breed |
| 8,184,852 B2 | 5/2012 | Hofman et al. |
| 8,204,439 B2 | 6/2012 | Twitchell, Jr. |
| 8,210,107 B2 | 7/2012 | Muirhead |
| 8,219,558 B1 | 7/2012 | Trandal et al. |
| 8,229,473 B1 | 7/2012 | De La Rue |
| 8,248,242 B2 | 8/2012 | Caliri et al. |
| 8,269,605 B2 | 9/2012 | Moore |
| 8,313,594 B2 | 11/2012 | Muirhead |
| 8,331,862 B2 | 12/2012 | Twitchell, Jr. |
| 8,347,794 B2 | 1/2013 | Muirhead |
| 8,511,555 B2 | 8/2013 | Babcock et al. |
| 8,514,058 B2 | 8/2013 | Cameron |
| 8,585,850 B2 | 11/2013 | Muirhead |
| 8,594,923 B2 | 11/2013 | Wong et al. |
| 8,630,768 B2 | 1/2014 | McClellan et al. |
| 8,692,764 B2 | 4/2014 | Marvit et al. |
| 8,694,251 B2 | 4/2014 | Janardhanan et al. |
| 8,830,072 B2 | 9/2014 | Batra et al. |
| 8,849,007 B2 | 9/2014 | Holeva et al. |
| 8,977,032 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,230,227 B2 | 1/2016 | Muirhead |
| 9,466,198 B2 | 10/2016 | Burch et al. |
| 9,488,986 B1 | 11/2016 | Solanki |
| 9,504,414 B2 | 11/2016 | Coza et al. |
| 9,613,239 B2 | 4/2017 | Lee et al. |
| 9,635,346 B2 | 4/2017 | Iida |
| 9,656,485 B2 | 5/2017 | Asai et al. |
| 9,679,237 B2 | 6/2017 | Linkesch et al. |
| 9,813,850 B2 | 11/2017 | Lee et al. |
| 9,868,212 B1 | 1/2018 | Hinterstoisser |
| 9,947,196 B2 | 4/2018 | Lee et al. |
| 9,965,662 B2 | 5/2018 | Lee et al. |
| 10,102,629 B1 | 10/2018 | Li |
| 10,242,273 B1 | 3/2019 | Eckman |
| 10,328,578 B2 | 6/2019 | Holz |
| 10,339,619 B2 | 7/2019 | Muirhead |
| 10,346,797 B2 | 7/2019 | Jacobus et al. |
| 10,347,005 B2 | 7/2019 | Iida et al. |
| 10,368,222 B2 | 7/2019 | Carlson et al. |
| 10,491,375 B2 | 11/2019 | Maggu et al. |
| 10,549,885 B2 | 2/2020 | de Bokx et al. |
| 10,614,319 B2 | 4/2020 | Douglas et al. |
| 10,816,637 B2 | 10/2020 | Conners et al. |
| 10,824,904 B2 | 11/2020 | Souder et al. |
| 10,867,301 B2 * | 12/2020 | Withrow ............ G06K 9/00577 |
| 2002/0047850 A1 | 4/2002 | Yoshioka |
| 2002/0070862 A1 | 6/2002 | Francis et al. |
| 2003/0083964 A1 | 5/2003 | Horwitz et al. |
| 2003/0089771 A1 | 5/2003 | Cybulski et al. |
| 2003/0137968 A1 | 7/2003 | Lareau et al. |
| 2003/0170357 A1 | 9/2003 | Garwood |
| 2004/0015264 A1 | 1/2004 | Holland et al. |
| 2004/0103031 A1 | 5/2004 | Weinschenk |
| 2004/0113786 A1 | 6/2004 | Maloney |
| 2004/0233041 A1 | 11/2004 | Bohman et al. |
| 2005/0046567 A1 | 3/2005 | Mortenson et al. |
| 2005/0063590 A1 | 3/2005 | Simon et al. |
| 2005/0226489 A1 | 10/2005 | Beach et al. |
| 2005/0231366 A1 | 10/2005 | McHugh et al. |
| 2005/0247775 A1 | 11/2005 | Gloekler et al. |
| 2006/0232412 A1 | 10/2006 | Tabacman et al. |
| 2006/0254474 A1 | 11/2006 | Roth et al. |
| 2006/0261959 A1 | 11/2006 | Worthy et al. |
| 2007/0091292 A1 | 4/2007 | Cho et al. |
| 2007/0095905 A1 | 5/2007 | Kadaba |
| 2007/0108296 A1 | 5/2007 | Konopka et al. |
| 2007/0115859 A1 | 5/2007 | Meyers |

(56) References Cited

U.S. PATENT DOCUMENTS

| | | |
|---|---|---|
| 2007/0282482 A1 | 12/2007 | Beucher et al. |
| 2008/0052205 A1 | 2/2008 | Dolley et al. |
| 2008/0106468 A1 | 5/2008 | Litva et al. |
| 2008/0114487 A1 | 5/2008 | Schuler et al. |
| 2008/0143484 A1 | 6/2008 | Twitchell |
| 2008/0198001 A1 | 8/2008 | Sarma et al. |
| 2009/0101712 A1 | 4/2009 | Ulrich et al. |
| 2010/0006377 A1 | 1/2010 | McCabe |
| 2010/0299278 A1 | 11/2010 | Kriss et al. |
| 2010/0310182 A1 | 12/2010 | Kroepfl et al. |
| 2010/0332407 A1 | 12/2010 | Grieve et al. |
| 2011/0040440 A1 | 2/2011 | de Oliveira et al. |
| 2011/0054979 A1 | 3/2011 | Cova |
| 2011/0095871 A1 | 4/2011 | Kail et al. |
| 2011/0169636 A1 | 7/2011 | Kadaba |
| 2011/0227725 A1 | 9/2011 | Muirhead |
| 2011/0251920 A1 | 10/2011 | Watson |
| 2011/0260869 A1 | 10/2011 | Gagnon |
| 2011/0265695 A1* | 11/2011 | Moore ............... B65D 19/0095 108/53.3 |
| 2011/0266338 A1 | 11/2011 | Babcock et al. |
| 2012/0066511 A1 | 3/2012 | Scheidt et al. |
| 2012/0105202 A1 | 5/2012 | Gits et al. |
| 2012/0126000 A1 | 5/2012 | Kunzig et al. |
| 2012/0166241 A1 | 6/2012 | Livingston et al. |
| 2012/0232430 A1 | 9/2012 | Boissy et al. |
| 2012/0239499 A1 | 9/2012 | Zughaib et al. |
| 2012/0252501 A1 | 10/2012 | Smith et al. |
| 2012/0323431 A1 | 12/2012 | Wong et al. |
| 2013/0022238 A1* | 1/2013 | Wood ............... G06K 5/00 382/103 |
| 2013/0041290 A1 | 2/2013 | Kording et al. |
| 2013/0041617 A1 | 2/2013 | Pease et al. |
| 2013/0045760 A1 | 2/2013 | Obermeyer et al. |
| 2013/0101230 A1 | 4/2013 | Holeva et al. |
| 2013/0324151 A1 | 12/2013 | Lee et al. |
| 2014/0016821 A1 | 1/2014 | Arth et al. |
| 2014/0049392 A1 | 2/2014 | Wagner |
| 2014/0062774 A1 | 3/2014 | Hale et al. |
| 2014/0120945 A1 | 5/2014 | Sharma et al. |
| 2014/0193077 A1 | 7/2014 | Shiiyama et al. |
| 2014/0222711 A1 | 8/2014 | Tibbs et al. |
| 2014/0289020 A1 | 9/2014 | Schullian et al. |
| 2014/0297485 A1 | 10/2014 | Steely et al. |
| 2014/0304123 A1 | 10/2014 | Schwartz |
| 2015/0039529 A1 | 2/2015 | Barakat |
| 2015/0062160 A1 | 3/2015 | Sakamoto et al. |
| 2015/0120597 A1 | 4/2015 | Dertadian |
| 2015/0127496 A1 | 5/2015 | Marathe et al. |
| 2015/0134403 A1 | 5/2015 | Schwartz |
| 2015/0146989 A1 | 5/2015 | Shiiyama et al. |
| 2015/0379510 A1 | 12/2015 | Smith |
| 2016/0021636 A1 | 1/2016 | Krallman et al. |
| 2016/0063550 A1 | 3/2016 | Caldwell |
| 2016/0189000 A1 | 6/2016 | Dube et al. |
| 2016/0198341 A1 | 7/2016 | Fransen |
| 2016/0198431 A1 | 7/2016 | Pattabiraman et al. |
| 2016/0205500 A1 | 7/2016 | Lee et al. |
| 2016/0205654 A1 | 7/2016 | Robinson |
| 2016/0239706 A1 | 8/2016 | Dijkman et al. |
| 2016/0259339 A1 | 9/2016 | High et al. |
| 2016/0260059 A1 | 9/2016 | Benjamin et al. |
| 2016/0260301 A1 | 9/2016 | Miller et al. |
| 2016/0321729 A1 | 11/2016 | Westphal |
| 2017/0015111 A1 | 1/2017 | Asai et al. |
| 2017/0019264 A1 | 1/2017 | Nugent et al. |
| 2017/0019754 A1 | 1/2017 | Wilkinson |
| 2017/0140408 A1 | 5/2017 | Wuehler |
| 2017/0193438 A1 | 7/2017 | Jones et al. |
| 2017/0243103 A1 | 8/2017 | Linkesch et al. |
| 2017/0323412 A1 | 11/2017 | Muirhead |
| 2017/0366357 A1 | 12/2017 | Pattanaik et al. |
| 2017/0372103 A1 | 12/2017 | Lee et al. |
| 2018/0009234 A1 | 1/2018 | Ohi et al. |
| 2018/0018627 A1* | 1/2018 | Ross ............... B64F 1/368 |
| 2018/0038805 A1 | 2/2018 | Heikkila et al. |
| 2018/0039524 A1 | 2/2018 | Dettori et al. |
| 2018/0082390 A1 | 3/2018 | Leidner et al. |
| 2018/0089638 A1 | 3/2018 | Christidis et al. |
| 2018/0143995 A1 | 5/2018 | Bailey et al. |
| 2018/0196680 A1 | 7/2018 | Wang et al. |
| 2018/0217250 A1 | 8/2018 | Cristache |
| 2018/0227570 A1* | 8/2018 | Page ............... H04N 13/324 |
| 2018/0232693 A1 | 8/2018 | Gillen et al. |
| 2018/0268348 A1 | 9/2018 | Guan |
| 2018/0293645 A1 | 10/2018 | Pannicke et al. |
| 2018/0304468 A1 | 10/2018 | Holz |
| 2018/0322453 A1 | 11/2018 | Lantz et al. |
| 2018/0342032 A1 | 11/2018 | Daigle et al. |
| 2019/0012637 A1 | 1/2019 | Gillen |
| 2019/0019144 A1 | 1/2019 | Gillen |
| 2019/0057231 A1 | 2/2019 | Bandil et al. |
| 2019/0080392 A1 | 3/2019 | Youb et al. |
| 2019/0098432 A1 | 3/2019 | Carlson et al. |
| 2019/0109702 A1 | 4/2019 | Maggu et al. |
| 2019/0130345 A1 | 5/2019 | Antor et al. |
| 2019/0190719 A1 | 6/2019 | van de Ruit et al. |
| 2019/0251385 A1 | 8/2019 | Kotula |
| 2019/0259062 A1 | 8/2019 | Caldwell |
| 2019/0340623 A1 | 11/2019 | Rivkind et al. |
| 2019/0370816 A1 | 12/2019 | Hu |
| 2020/0019927 A1 | 1/2020 | Muirhead |
| 2020/0118117 A1 | 4/2020 | McManus et al. |
| 2020/0184291 A1 | 6/2020 | Tisdel |
| 2020/0209343 A1 | 7/2020 | Connors et al. |
| 2020/0272986 A1 | 8/2020 | Bandil et al. |

FOREIGN PATENT DOCUMENTS

| | | |
|---|---|---|
| CN | 106471526 | 3/2019 |
| DE | 9306107 | 8/1994 |
| DE | 102006009802 | 4/2007 |
| DE | 202012008230 | 10/2012 |
| EP | 1246094 | 10/2002 |
| EP | 3128471 | 2/2017 |
| EP | 2593372 | 2/2018 |
| EP | 3323756 | 5/2018 |
| JP | 2006243873 | 9/2006 |
| JP | 2017019586 | 1/2017 |
| WO | 9616387 | 5/1996 |
| WO | 2008038017 | 4/2008 |
| WO | 2010114478 | 10/2010 |
| WO | 2017165909 | 10/2017 |
| WO | 2019010480 | 1/2019 |

OTHER PUBLICATIONS

GoTo Pallets inc. "The future of the pallet pooling industry begins with the G2 Pallet." Retrieved capture from http://gotopallets.com for the date of Oct. 1, 2016, 77 pages.

GoTo Pallets Marketing Brochure dated Oct. 12, 2016. Retrieved from http://gotopallets.com 8 pages.

Intermec's Intellitag RFID Technology Enables CHEP's. Global Pallet Tracking Business Wire Nov. 13, 2001: 0480.

International Search Report and Written Opinion for PCT/US2018/026461 dated Jul. 5, 2018, all pages.

International Preliminary Report on Patentability for PCT/US2018/026461 dated Jun. 25, 2019, all pages.

International Preliminary Report on Patentability for PCT/US2018/030659, dated Aug. 7, 2019, 19 pages.

International Search Report and Written Opinion for PCT/US2018/030659 dated Aug. 3, 2018, 14 pages.

International Search Report and Written Opinion for PCT/US2018/030672 dated Jul. 13, 2018, all pages.

International Preliminary Report on Patentability for PCT/US2018/030672 dated Nov. 5, 2019, all pages.

International Search Report and Written Opinion for PCT/US2018/031367 dated Aug. 1, 2018, all pages.

International Preliminary Report on Patentability for PCT/US2018/031367 dated Sep. 6, 2019, all pages.

(56) References Cited

OTHER PUBLICATIONS

International Search Report and Written Opinion for PCT/US2018/034083 dated Oct. 24, 2018, 11 pages.
International Preliminary Report on Patentability for PCT/US2018/034083 dated Nov. 26, 2019, all pages.
International Search Report and Written Opinion for PCT/US2018/045964 dated Nov. 19, 2018, all pages.
International Preliminary Report on Patentability for PCT/US2018/045964 dated Apr. 21, 2020, all pages.
International Search Report and Written Opinion for PCT/US2018/047035 dated Oct. 31, 2018, all pages.
International Preliminary Report on Patentability for PCT/US2018/047035 dated Mar. 5, 2020, all pages.
International Search Report and Written Opinion for PCT/US2018/048832 dated Oct. 30, 2018, all pages.
International Preliminary Report on Patentability for PCT/US2018/048832 dated Apr. 28, 2020, all pages.
International Search Report and Written Opinion for PCT/US2019/068476 dated Feb. 25, 2020, all pages.
International Search Report and Written Opinion for PCT/US2020/019698 dated Jun. 30, 2020, all pages.
Jihoon et al., "Geo-Fencing: Geographical-Fencing Based Energy-Aware Proactive Framework for Mobile Devices," Quality of Service (IWQOS), 2012 IEEE 20th International Workshop, Jun. 4, 2012, pp. 1-9.
Mohamed, "Detection and Tracking of Pallets using a Laser Rangefinder and Machine Learning Techniques," Retrieved from https://www.researchgate.net/profile/Ihab_S_Mohamed/publication/324165524_Detection_and_Tracking_of_Pallets_using_a_Laser_Rangefinder_and_Machine_Learning_Techniques/links/5ac2b5300f7e9bfc045f3547/Detection-and-Tracking-of-Pallets-using-a-Laser-Rangefinder, Sep. 22, 2017, 76 pages.
Pallet tracking leads RFID applications. (News Briefs). Knill, Bernie. Material Handling Management 57.1: 8(2). Penton Media, Inc., Penton Business Media, Inc. and their subsidiaries. (Jan. 2002).
"Recommendations on the Grocery Industry Pallet System," written for the The Grocery Industry Pallet Subcommittee by Cleveland Consulting Associates, Jan. 1, 1992, 16 pages.
Roussel, J., "Making the Supply Chain Everyone's Business," May 9, 2014, 8 pages.
Weber et al., "Untrusted Business Process Monitoring and Execution Using Blockchain," Medical Image Computing and Computer-Assisted Intervention—Miccai 2015 : 18th International Conference, Munich, Germany, Sep. 8, 2016, pp. 329-347.
Xin et al., "Large Visual Repository Search with Hash Collision Design Optimization", Institute of Electrical and Electronics Engineers MultiMedia, vol. 20, Issue 2, Apr. 2013, pp. 62-71.
G. Yang, K. Xu and V.O.K. Li, "Hybrid Cargo-Level Tracking System for Logistics," 2010 IEEE 71st Vehicular Technology Conference, Taipei, 2010, pp. 1-5, doi: 10.1109/VETECS.2010.5493655. (Year: 2010).
Cho et al., "Design and Implementation of an Active RFID System Platform," IEEE Explore, (2005), 4 pages.
Examination report No. 1 for patent application AU 2018353840 dated Feb. 25, 2021, all pages.
Examination report No. 2 for patent application AU 2018321284 dated Mar. 23, 2022, all pages.
Glocker Maik: "DB kombibahnhof—Brucken umsetzen von Ikw auf Zug", Internet Article, Jul. 20, 2016 (Jul. 20, 2016), XP055789046, Retrieved from the Internet:URL:https://www.youtube.com/watch?v=koMM6HopqiM [retrieved on Mar. 23, 2021].
International Preliminary Report on Patentability for PCT/US2020/019698 dated Aug. 25, 2021, all pages.
Office Action and Search Report for CN 201880076616.3 dated Aug. 23, 2021, all pages.
Schuhmacher Gerhard: "ZU Container Berlin", Internet Article, Aug. 1, 2016 (Aug. 1, 2016), XP055789042, Retrieved from the Internet: URL:https://de.wikipedia.org/wiki/Datei:ZU_Container_Berlin.JPG [retrieved on Mar. 23, 2021) all pages.

* cited by examiner

SYSTEMS AND METHODS FOR PALLET IDENTIFICATION

CROSS-REFERENCES TO RELATED APPLICATIONS

This application is a continuation of U.S. patent application Ser. No. 15/969,195, filed May 2, 2018, which is incorporated herein by reference. U.S. patent application Ser. No. 15/969,195 claims the benefit of U.S. Provisional Patent Application No. 62/500,462, filed May 2, 2017, which is incorporated herein by reference.

FIELD

The present disclosure generally relates to cargo transportation utilizing pallets, and more specifically to systems and methods for pallet identification using visual features.

BACKGROUND

Monitoring pallet movement through a supply and distribution chain can aid in diagnosing issues with pallet loss and recovery, pallet damage and pallet cycle time. To achieve comprehensive monitoring, each pallet must be labeled with a unique identifier. In conventional systems, the unique identifier is indicated and/or stored on a physical device, such as a numerical tag, a bar code, an RFID tag, or an electronic device. However, physically attached identification devices can easily become damaged or fall off when the pallet is moved through the supply chain.

BRIEF SUMMARY

Provided are methods, including computer-implemented methods, devices, and computer-program products applying systems and methods for pallet identification. According to some embodiments of the invention, a pallet may be visually identified through photographs with or without attaching physical labels, such as bar codes, QR codes, serial numbers, stencils, brands, embossing, stamps, etc. Thus, the status of pallets may be monitored (e.g., their location and structural integrity) as they move through the supply chain.

According to some embodiments of the invention, a computer-implemented method is provided. The method comprises receiving, at a server computer located in a cloud, an image file depicting a plurality of visual features organized in a plurality of spatial orientations on a pallet. The image file was generated by an imaging device located at a facility housing the pallet in a supply chain. The pallet is included in a plurality of known pallets in the supply chain. The method further comprises generating a set of unidentified vectors associated with the pallet using the plurality of visual features and the plurality of spatial orientations. The method further comprises accessing a database storing a plurality of sets of known vectors in association with a plurality of known pallet identifiers corresponding to the plurality of known pallets in the supply chain. The method further comprises comparing the set of unidentified vectors to the plurality of sets of known vectors to identify a matching set of known vectors and an associated known pallet identifier. The method further comprises generating data associated with the pallet. The method further comprises storing the data as an entry in the database corresponding to the associated known pallet identifier.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
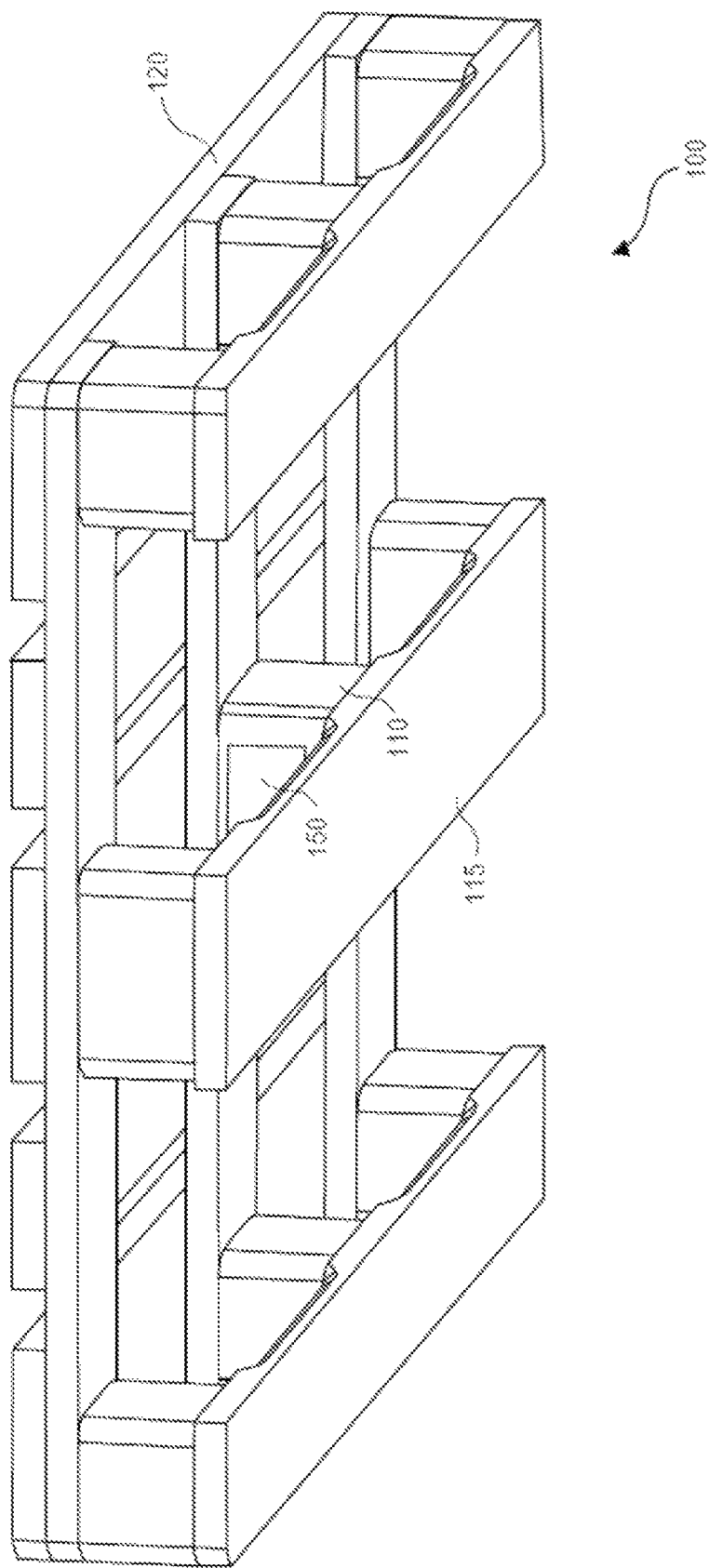
FIG. 1 is a bottom perspective view of a pallet with a beacon, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Pallets

A pallet may be a structure that supports physical assets for storage, presentation, handling, and/or transportation. As used herein, the term "pallet" may be used to describe any load carrier, including any type of platform, dolly, bin, container, and the like. The physical assets may be any physical assets, such as perishable or nonperishable physical goods. FIG. 1 is a bottom perspective view of a pallet 100, in accordance with some embodiments. The pallet 100 may include a base 120 and legs 110. The pallet 100 may be of any size, shape, and/or dimension, and may be made of any material or combination of materials. The base 120 and legs 110 may be of any size, shape, and/or dimensions. The base 120 may be flat and/or otherwise configured to support the shape and/or weight of the physical asset to be held on the pallet 100. Although shown as having a particular design in FIG. 1, it is contemplated that any design may be incorporated on or in the base 120. For example, the base 120 may have smaller, larger, fewer, more, differently shaped, or differently placed spacing than those shown in FIG. 1, depending on characteristics of the particular physical asset to be placed on the base 120 (e.g., weight, shape, temperature requirements, size, etc.).

The legs 110 may be sized and positioned to support the particular physical asset. In some embodiments, the legs 110 may be sized and positioned to allow a forklift, crane, or jacking device to engage and lift the pallet 100 between the legs 110. Although shown and described as having three legs 110, it is contemplated that the pallet 100 may have any suitable number of legs or no legs. For example, in some embodiments, the pallet 100 may include a base 120 on both the top and bottom of the pallet 100 with no legs. In another example, for heavier physical assets, the pallet 100 may include one or more additional legs centrally located with respect to the pallet 100 to prevent sagging of the base 120. Further, although shown and described as being in a particular orientation and having a particular size, it is contemplated that the legs 110 may be of any size (e.g., height, length, width, depth, etc.) and/or orientation (e.g., parallel to each other, perpendicular to each other, etc.).

The pallet 100 may be made of any suitable material, depending on the characteristics of the particular physical asset to be supported by the pallet 100. For example, the pallet 100 may be wooden, plastic, and/or metal. In some embodiments, the pallet 100 may be constructed to include unique physical features. In some embodiments, the base 120 may be made of a same or different material than the legs 110. In some embodiments, the base 120 and the legs 110 may form a single unitary body (e.g., formed from a single mold). In some embodiments, the base 120 may be removable from one or more of the legs 110.

Figure 2:
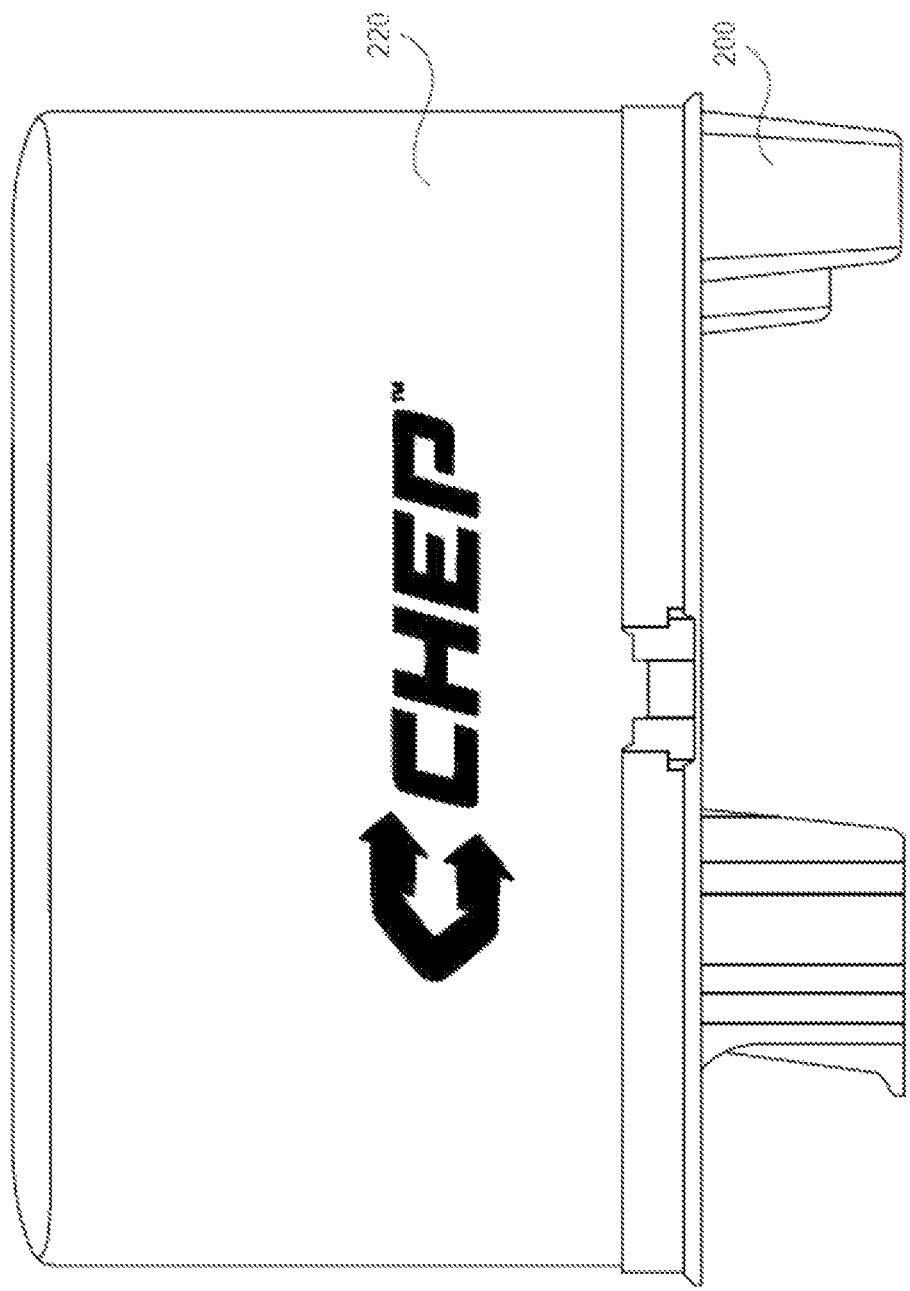
FIG. 2 is a side view of a pallet with a load, in accordance with some embodiments.

In some embodiments, additional components may be integrated with the pallet 100. For example, the underside of the pallet 100 may include a beacon 150. The beacon 150 may include a number of different functionalities. For example, the beacon 150 may be programmed with the type of physical asset located on the pallet 100 and/or an identifier of the pallet 100. The beacon 150 may further include or be in operable communication with one or more sensors configured to monitor certain conditions of the pallet 100 (e.g., environmental conditions, movements, etc.). The beacon 150 is described further herein with respect to FIG. 3. Although shown as being located in a particular position on the pallet 100, it is contemplated that the beacon 150 may be located in any suitable position on the pallet 100. FIG. 2 is a side view of another exemplary pallet 200 with a load 220 placed atop the pallet 200 for transportation, storage, presentation, etc. As used herein, pallet 100 may be referred to interchangeably with pallet 200.

Figure 3:
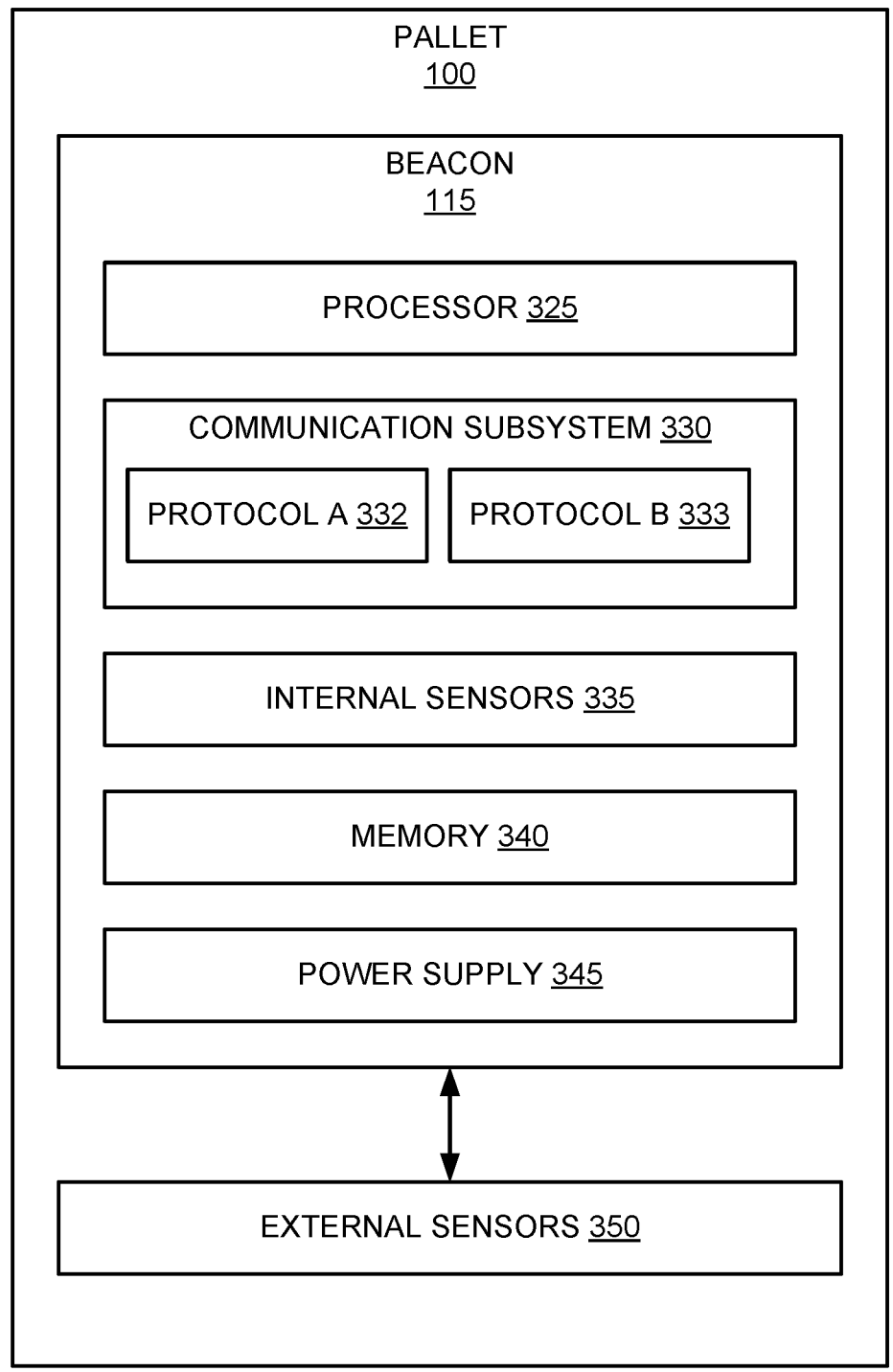
FIG. 3 is a block diagram illustrating a pallet, in accordance with some embodiments.

The pallet 100 and/or 200 may include components for performing multiple functions, as described herein. FIG. 3 is a block diagram illustrating the system components of the pallet 100 and/or 200, in accordance with some embodiments. The pallet 100 and/or 200 may include a beacon 115 in operative communication with one or more external sensors 350. The beacon 115 may include device hardware coupled to a memory 340. The device hardware may include a processor 325, a communication subsystem 330, internal sensors 335, and a power supply 345. In some embodiments, the beacon 115 may be implemented as an active tag (e.g., an RFID tag). The beacon 115 may be associated with an identifier (e.g., an active tag identifier).

The processor 325 may be implemented as one or more integrated circuits (e.g., one or more single core or multicore microprocessors and/or microcontrollers), and may be used to control the operation of the beacon 115. The processor 325 can execute a variety of programs in response to program code or computer-readable code stored in memory 340, and can maintain multiple concurrently executing programs or processes. The communication subsystem 330 may include one or more transceivers and/or connectors that can be used by the beacon 115 to communicate with other devices (e.g., the external sensors 350, access devices, etc.) and/or to connect with external networks. In some embodiments, the communication subsystem 330 may be configured to communicate using more than one protocol (e.g., protocol A 332 and protocol B 333). Protocol A 332 and protocol B 333 may be two different wired or wireless communication protocols. For example, protocol A 332 and protocol B 333 may be selected from the group including Bluetooth, Bluetooth LE, near field communication, WiFi, cellular communication, Ethernet, fiber optics, etc. The particular protocol used for a particular communication may be determined based on any of a number of factors, including availability, signal strength, type and/or amount of power received from or remaining on power supply 345, data throughput, type of data to be communicated, size of data to be communicated, and the like.

The internal sensors 335 may include any movement-related, location-related, and/or environmental-related sensors. For example, the internal sensors 335 may include a global positioning system (GPS), an accelerometer, a gyroscope, a barometer, a thermometer, a humidity sensor, a light sensor, a microphone, combinations thereof, and/or the like. The internal sensors 335 may be coupled to the communication subsystem 330, such that sensor measurements may be transmitted off of the pallet 100 to other devices or systems, as described further herein.

The memory 340 may be implemented using any combination of any number of non-volatile memories (e.g., flash memory) and volatile memories (e.g., DRAM, SRAM), or any other non-transitory storage medium, or a combination thereof media. In some embodiments, the memory 340 may be included in the processor 325. The power supply 345 may include any wired or wireless power supply, such as a power outlet supply, a solar panel, and/or a battery.

The beacon 115 may be coupled to one or more external sensors 350 on the pallet 100. The external sensors 350 may include, for example, a weight sensor and/or any of the sensors described above with respect to the internal sensors 335. In one example, the weight sensor may include circuitry that measures the weight of a load on the pallet 100. The weight sensor may transmit the weight to the beacon 115. The beacon may use the communication subsystem 330 to transmit this data off of the pallet 100 to other devices or systems, as described further herein.

Systems for Pallet Identification

In some cases, it may be desirable to identify a pallet. According to some embodiments of the invention, a pallet may be visually identified through photographs without attaching physical tags or labels. Thus, the status of pallets may be monitored (e.g., their location and/or structural integrity) as they move through the supply chain. Further, physical devices may not be necessary to identify the pallets, which may be desirable as they may become damaged, come loose, become destroyed, or get separated from the pallets as they move through the supply chain.

Figure 4:
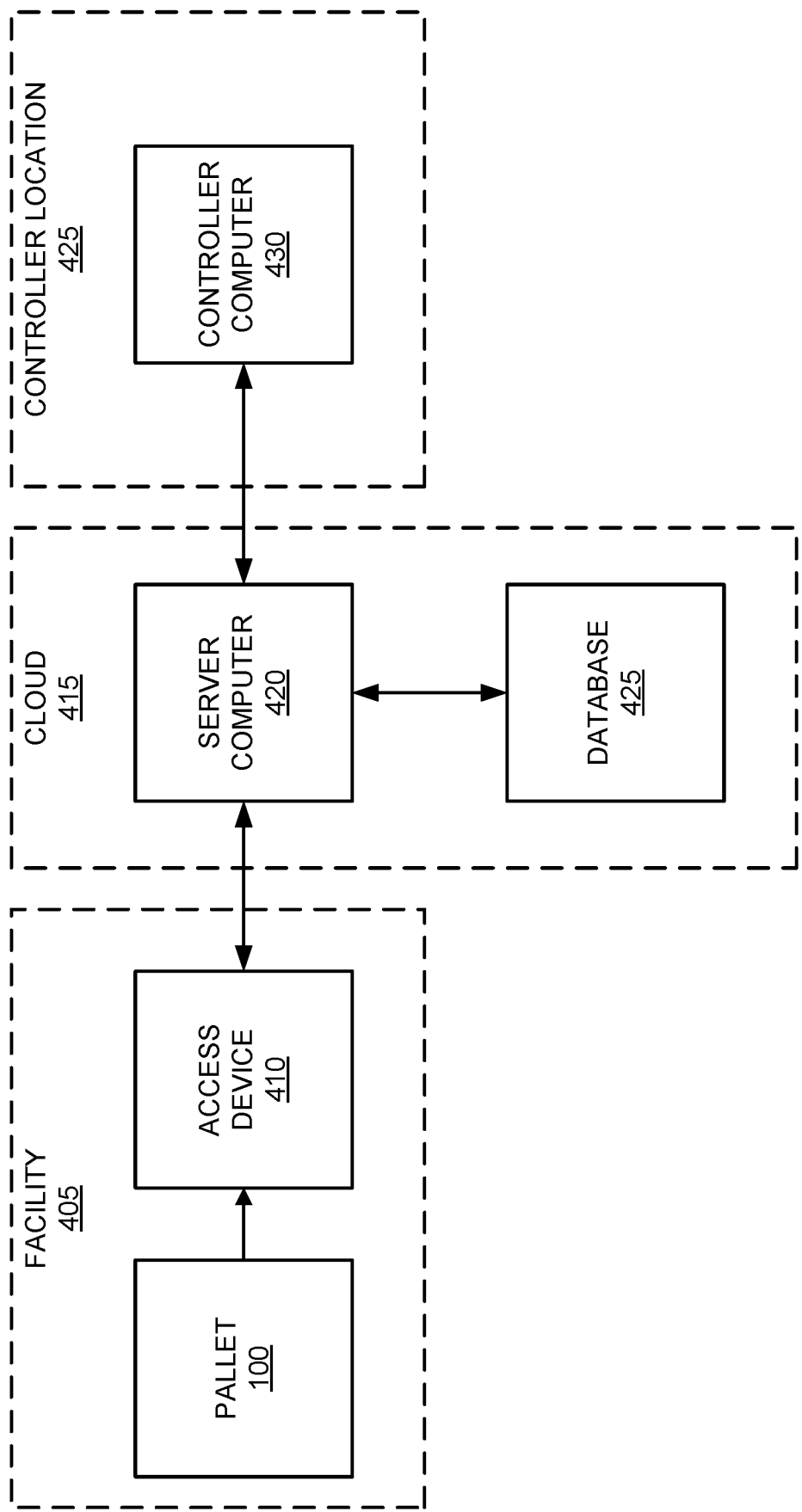
FIG. 4 is a block diagram illustrating a system for pallet identification, in accordance with some embodiments.

FIG. 4 is a block diagram illustrating a system for pallet identification, in accordance with some embodiments. The system may include a pallet 100, an access device 410, a server computer 420, a database 425, and a controller computer 430. The pallet 100 and the access device 410 may be located at a facility 405 in the supply chain, such as a warehouse or store. The server computer 420 and the database 425 may be located in the cloud, such as at one or more offsite or third party locations with online or networked storage. The controller computer 430 may be located at a controller location, such as at a pallet logistics and tracking company. Although shown and described with respect to a certain number of entities performing certain functions, it is contemplated that a greater or fewer number of entities may perform the functions described herein. For example, the functions of the server computer 420 may be spread across multiple server computers. In another example, the database 425 may be incorporated internally to the server computer 420. In still another example, the functions of the server computer 420 may be partially or wholly be performed by the access device 410.

In some embodiments, the pallet 100 may communicate data to the access device 410 to cause the access device 410 to perform one or more operations. For example, the pallet 100 may communicate (or cause to be communicated) a signal indicating that the pallet 100 is within a visual range of the access device 410. The signal may be communicated, for example, by a Bluetooth or Bluetooth LE tag on the pallet 100. When the access device 410 receives the signal, the access device 410 may capture an image of the pallet 100 using a camera or other image capture hardware and/or software, as described further herein. For example, the access device 410 and/or the pallet 100 may implement a photoeye or photoelectric sensor. In some embodiments, the pallet 100 may not include a tag capable of short range communication. Thus, the access device 410 may be manually caused to capture an image of the pallet 100 in some embodiments (e.g., by selecting an image capture option on the user interface). This may happen at any time or interval, such as when the pallet 100 enters the facility 405, when the pallet 100 is leaving the facility 405, once a day, etc.

The access device 410 may be any suitable electronic user device. The access device 410 may include a communication device. A communication device may provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. The access device 410 may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 410 may include a POS or point of sale device (e.g., POS terminals), cellular phone, PDA, personal computer (PCs), tablet PC, hand-held specialized reader, set-top box, electronic cash register (ECR), virtual cash registers (VCR), kiosk, and the like.

The access device 410 may have an application installed that allows it to upload the image file depicting the pallet 100 to a server computer 420. The image file of the pallet 100 may include visual features organized in spatial orientations. For example, the visual features may include a unique or uncommon set of markings on the pallet 100, such as letters, numbers, symbols, graphics, colors, marks, dents, scratches, patterns, grains, etc. In embodiments in which the pallet 100 is wooden, the visual features may include wood grain marks and patterns, such as a direction of the wood cells (e.g., straight grain, spiral grain, interlocked, etc.), surface appearance, growth ring placement, plane of the cut (quarter sawn, flat sawn, end grain, etc.), rate of growth, relative cell size, etc. The spatial orientations may describe the distance between visual features and/or the orientation of visual features with respect to each other.

The access device 410 may be in communication with the server computer 420. The access device 410 may forward the image file of the pallet 100 to the server computer 420. The server computer 420 may generate a set of unidentified vectors associated with the pallet 100 using the visual features and the spatial orientations. The server computer 420 may access a database 425 storing sets of known vectors in association with known pallet identifiers corresponding to known pallets in the supply chain. For example, each pallet in the supply chain may be assigned a pallet identifier that uniquely identifies the pallet, and may be stored in association with vectors generated based on the visual features and spatial orientations of each pallet. The server computer 420 may compare the set of unidentified vectors corresponding to the pallet 100 to the sets of known vectors to identify a matching set of known vectors and its associated known pallet identifier from the database 425. In some embodiments, the server computer 420 may identify a lack of a pallet in an image. In some embodiments, the server computer 420 may identify multiple pallets in an image, and may process one pallet image at a time.

The server computer 420 may generate data associated with the pallet 100 once it is identified, and store the data as an entry in the database 425 corresponding to the associated known pallet identifier. For example, the server computer 420 may generate data noting differences between the image file of the pallet 100 just collected and the stored set of vectors associated with the pallet 100. Such data may be indicative of damage to the pallet 100. In another example, the server computer 420 may generate location data for the pallet 100 (e.g., data indicative of the facility 405). In some embodiments, the server computer 420 may provide this data from the database 425 to a controller computer 430. The controller computer 430 may be an entity that tracks, maintains, and/or owns the pallet 100. The controller computer 430 may use this data to invoice shippers, carriers, and/or customers for damage to the pallet 100, to determine whether the pallet 100 is at the correct facility 405, to determine where the pallet 100 is in the supply chain, to determine the cycle time of the pallet 100, to predict timing of the pallet 100 at a particular location, etc.

In some embodiments, the functions of the server computer 420 may be performed wholly or partially by the access device 410. For example, in some embodiments, the size of the transmission sent to the server computer 420 by the access device 410 may be reduced by performing the image analysis and feature extraction on the access device 410. The unidentified vectors may further be generated by the access device 410 based on the image analysis and feature extraction. The data vectors, which have a small memory footprint, may then be transmitted to the server computer 420 and run through the database 425.

Figure 5:
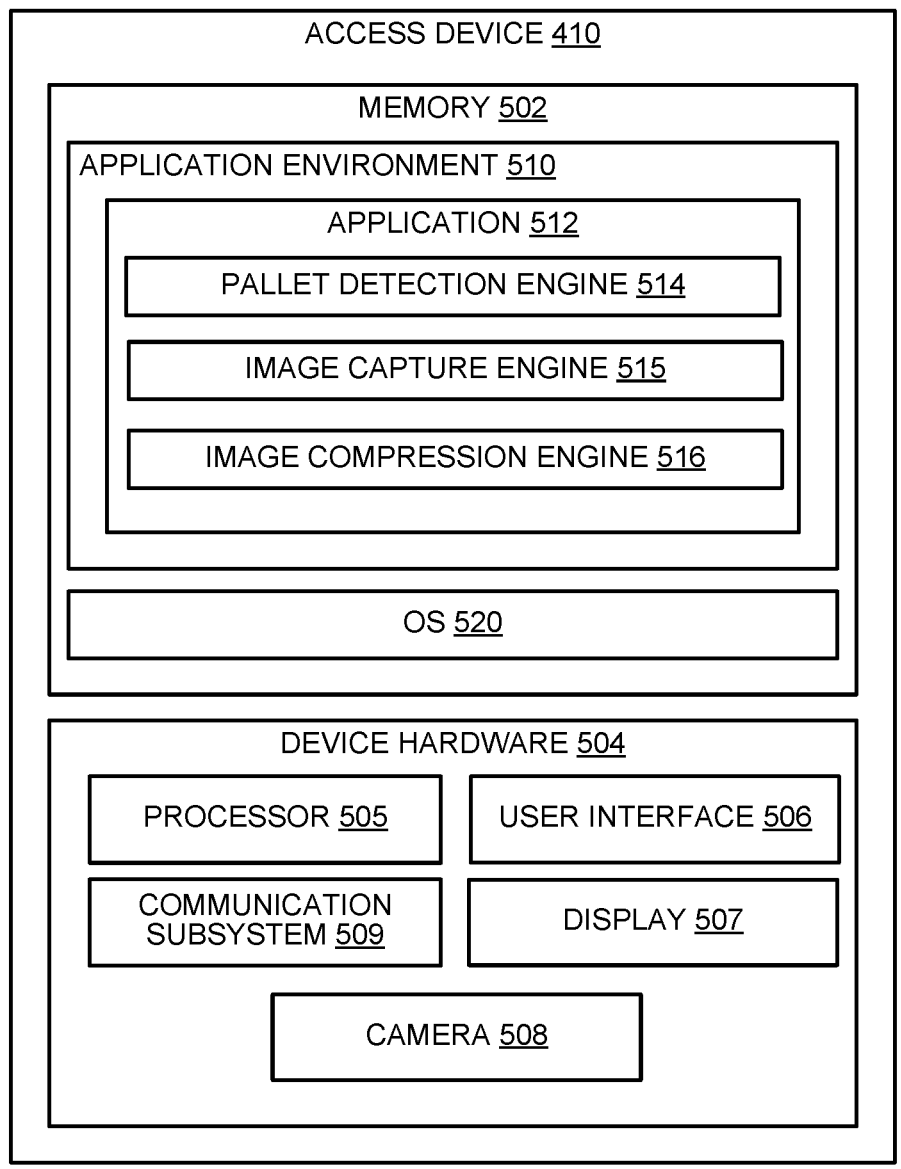
FIG. 5 is a block diagram illustrating an access device, in accordance with some embodiments.

FIG. 5 is a block diagram illustrating an access device 410, in accordance with some embodiments. The access device 410 may include device hardware 504 coupled to a memory 502. Device hardware 504 may include a processor 505, a camera 508, a communication subsystem 509, and a user interface 506. In some embodiments, device hardware 504 may include a display 507 (which can be part of the user interface 506).

Processor 505 can be implemented as one or more integrated circuits (e.g., one or more single core or multicore microprocessors and/or microcontrollers), and is used to control the operation of the access device 410. Processor 505 can execute a variety of programs in response to program code or computer-readable code stored in memory 502, and can maintain multiple concurrently executing programs or processes. Communication subsystem 509 may include one or more transceivers and/or connectors that can be used by access device 410 to communicate with other devices (e.g., the pallet 100) and/or to connect with external networks (e.g., to connect to the server computer 420). User interface 506 can include any combination of input and output elements to allow a user to interact with and invoke the functionalities of the access device 410. In some embodiments, user interface 506 may include a component such as display 507 that can be used for both input and output functions. Camera 508 may be implemented as hardware in conjunction with software to capture visual features and/or images of pallets, for example, as described further herein. Memory 502 can be implemented using any combination of any number of non-volatile memories (e.g., flash memory) and volatile memories (e.g., DRAM, SRAM), or any other non-transitory storage medium, or a combination thereof media. Memory 502 may store an operating system (OS) 520 and an application environment 510 where one or more applications reside including application 512 to be executed by processor 505.

In some embodiments, application 512 may be an application that captures, stores, and/or transmits images of pallets for visual identification in a cloud environment. Application 512 may include a pallet detection engine 514, an image capture engine 515, and an image compression engine 516. In some embodiments, one or more of these components can be provided by another application or component that is not part of application 512.

The pallet detection engine 514 may be configured to, in conjunction with the processor 505 and the communication subsystem 509, receive a ping (i.e., a brief signal) from a pallet in proximity to the access device 410. In some embodiments, the pallet may be configured to send a ping to the communication subsystem 509 when within a certain distance of the access device 410 (e.g., 10 feet). In some embodiments, the pallet may be configured to send a ping to the communication subsystem 509 when within any communication range of the access device 410 (e.g., 50 feet), and the pallet detection engine 514 may monitor the distance between the access device 410 and the pallet based on the pings. In some embodiments, when the pallet is detected by the pallet detection engine 514, the pallet detection engine 514 may transmit an image capture signal to the image capture engine 515. In some embodiments, when the pallet is detected by the pallet detection engine 514 to be at a particular distance from the access device 410 and/or in a particular orientation with respect to the access device 410

(which may be inferred from data collected by sensors on the pallet, such as accelerometers, gyroscopes, etc.), the pallet detection engine 514 may transmit an image capture signal to the image capture engine 515.

The image capture engine 515 may be configured to, in conjunction with the processor 505, receive an image capture signal from the pallet detection engine 514 based on detection of the pallet. In response to receiving the image capture signal, the image capture engine 515 may capture an image of the pallet. For example, a pallet may be positioned at the beginning of a conveyor belt, with the access device 410 positioned halfway down the conveyor belt and positioned six feet above with the camera 508 pointing down toward the conveyor belt. The pallet may include a Bluetooth LE tag programmed to send a ping (either on its own initiative or in response to a ping from the access device 410) when it is within six feet of the access device 410. Thus, when the pallet is directly below the access device 410, the pallet may transmit a ping to the access device 410 (e.g., via the pallet detection engine 514). The pallet detection engine 514 may transmit an image capture signal to the image capture engine 515. The image capture engine 515 may then cause the camera 508 to capture an image of the pallet directly below the access device 410 as the pallet moves on the conveyor belt. In some embodiments, the image capture engine 515 may be configured to capture images of the pallet immediately before and immediately after any repair to reduce the negative effects of changes to the pallet visual appearance.

Although described as an automated process using the pallet detection engine 514 and the image capture engine 515, it is contemplated that in some embodiments, the pallet detection engine 514 may be omitted. In these embodiments, the image capture engine 515 may include software that allows a user to manually initiate image captures using the camera 508. For example, a user may approach a pallet with the access device 410, and select an option on the user interface 506 that activates that image capture engine 515 and captures an image of the pallet using the camera 508.

In some embodiments, the application 512 may further include an image compression engine 516. The image compression engine 516 may be configured to, in conjunction with the processor 505, compress images captured by the camera 508 to a lower data size and/or resolution. In some embodiments, the images captured by the camera 508 may be very high resolution. However, such a high resolution may not be needed in order to analyze the visual features of the pallets captured in the images. Thus, the image compression engine 516 may compress the images to a lower resolution that is still suitable for analysis (i.e., to the smallest resolution in which the visual features of the pallets may still be identified). Such compression may also reduce transmission time of the images off of the access device 410. The compression may be lossless compression, in one embodiment. Possible compression modes include JPLL (JPEG lossless), JLSL (JPEG-LS Lossless), J2KR (JPEG 2000 Lossless), and JPLY (JPEG Lossy). In some embodiments, the image compression engine 516 may reduce the data size of the image file by identifying vectors present in the image as described further herein, then transmitting the vectors or representations of the vectors for analysis.

Figure 6:
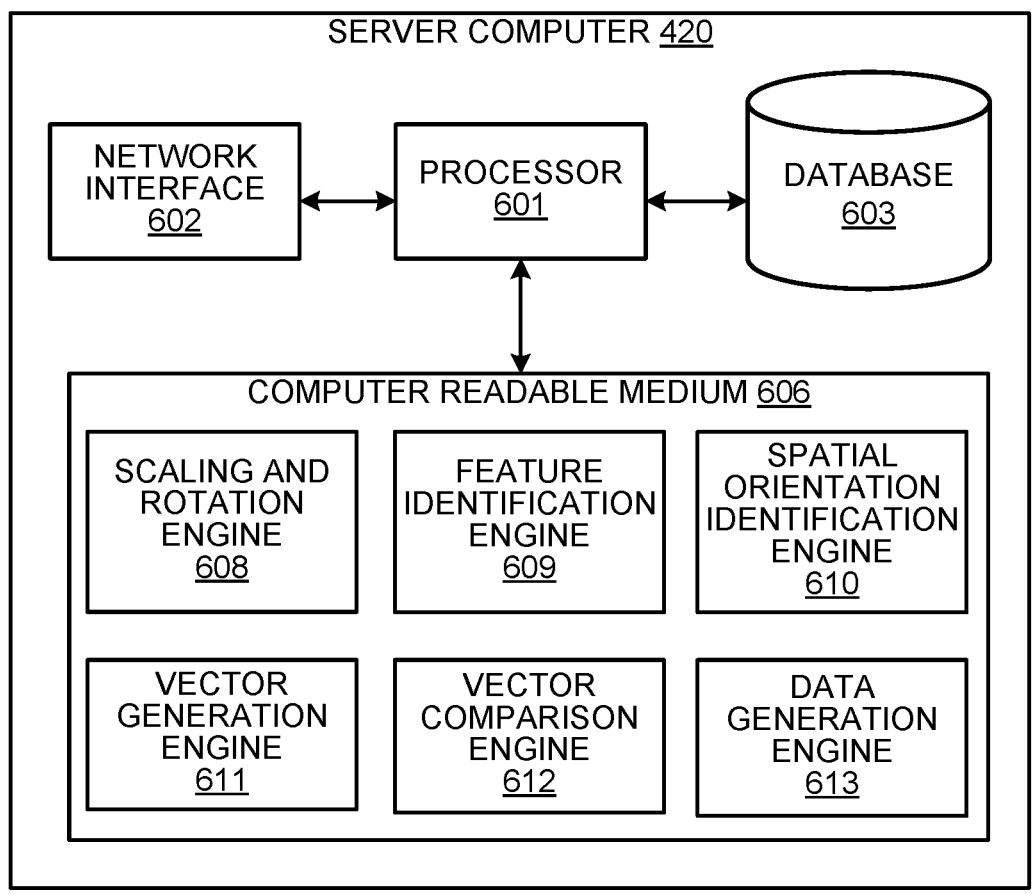
FIG. 6 is a block diagram illustrating a server computer, in accordance with some embodiments.

FIG. 6 is a block diagram illustrating a server computer 420, in accordance with some embodiments. Server computer 420 may include a processor 601 coupled to a network interface 602 and a computer readable medium 606. Server computer 420 may also include or otherwise have access to a database 603 that may be internal or external to the server computer 420.

Processor 601 may include one or more microprocessors to execute program components for performing the pallet identification functions of the server computer 420. Network interface 602 may be configured to connect to one or more communication networks to allow the server computer 420 to communicate with other entities, such as the access device, the controller computer, etc. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the image analysis functions of server computer 420. For example, computer readable medium 606 may include code implementing a scaling and rotation engine 608, a feature identification engine 609, a spatial orientation identification engine 610, a vector generation engine 611, a vector comparison engine 612, and a data generation engine 613. In some embodiments, the scaling and rotation engine 608, the feature identification engine 609, the spatial orientation identification engine 610, and/or the vector generation engine 611 may be omitted from the server computer 420, and instead be implemented by the access device 410.

The scaling and rotation engine 608 may be configured to, in conjunction with the processor 601, receive an image of a pallet from an access device in an image file. The scaling and rotation engine 608 may be configured to scale, rotate, crop and/or align the image of the pallet to meet particular criteria or standards. For example, the scaling and rotation engine 608 may resize the image of the pallet to be a particular standard size, such as 1000 pixels by 1000 pixels. In another example, the scaling and rotation engine 608 may be configured to crop the image of the pallet such that only the pallet is shown (i.e., eliminating background images). In another example, the scaling and rotation engine 608 may be configured to align the image of the pallet such that its edges are viewed as being horizontally and vertically oriented. In another example, the scaling and rotation engine 608 may be configured to rotate the image of the pallet clockwise and/or counterclockwise to change which side of the pallet is seen as being the "top" and "bottom", i.e., a 90, 180 or 270 degree rotation. The image may be rotated into a standard orientation used for analysis, e.g., with a logo, arrow or other marking being right side up. In some embodiments, it may not be necessary to scale, rotate, crop and/or align the image for analysis. In such embodiments, it is contemplated that the scaling and rotation engine 608 may be omitted.

The feature identification engine 609 may be configured to, in conjunction with the processor 601 and the network interface 602, receive the image of the pallet. The feature identification engine 609 may be configured to analyze the image to identify visual features of the pallet. The visual features may include any unique characteristics or combination of characteristics that are together unique to a particular pallet. Such visual features may include size, color, dimensions, holes, dents, text, graphics, scratches, textures, levels, depressions, nail location pattern, paint, board orientation, damage, combinations thereof, and/or the like. With respect to a pallet either partially or fully formed of wood, the visual features may include wood grain marks and patterns, such as a direction of the wood cells (e.g., straight grain, spiral grain, interlocked, etc.), surface appearance, growth ring placement, plane of the cut (quarter sawn, flat sawn, end grain, etc.), rate of growth, relative cell size, etc. It is contemplated that any number of visual features may be identified. In general, a higher probability of finding a match to the pallet with greater accuracy may result if more visual features are identified. The feature identification engine 608 may be configured to indicate one or more of the visual features in the image and/or the image file. For example, the feature identification engine 609 may be configured to indicate the visual features in the image (e.g., by outlining each of the identified visual features, by adding arrows pointing to each of the visual features, etc.). In another example, the feature identification engine 609 may be configured to indicate the visual features in a file separate from or combined with the image file (e.g., by listing pixel coordinates and/or areas in which the identified visual features are located). It is contemplated that the feature identification engine 609 may be implemented using computer vision analysis and/or deep neural networks.

The spatial orientation identification engine 610 may be configured to, in conjunction with the processor 601, receive the image and the identified visual features from the feature identification engine 609. The spatial orientation identification engine 610 may be configured to analyze the visual features of the image to identify the spatial orientations of the visual features. The spatial orientations may describe the distance between visual features and/or between a visual feature and a fixed point, and/or the orientation of visual features with respect to each other and/or with respect to a fixed point. The spatial orientation identification engine 610 may be configured to indicate the spatial orientations in a file separate from or combined with the image file. For example, the spatial orientation identification engine 610 may indicate that a given wood grain marking is oriented at a 45 degree angle with respect to the top of the pallet shown in the image. It is contemplated that the spatial orientation identification engine 610 may be implemented using computer vision analysis and/or deep neural networks.

The vector generation engine 611 may be configured to, in conjunction with the processor 601, receive the image, identified visual features, and spatial orientations from the spatial orientation identification engine 610 and/or the feature identification engine 609. The vector generation engine 611 may be configured to generate vectors using the visual features and the spatial orientations. The vectors may include ordered groups of numerical values representing the visual features and the spatial orientations. In some embodiments, the vectors may be strings of 256 numbers.

The vector comparison engine 612 may be configured to, in conjunction with the processor 601, receive the vectors corresponding to the image of the pallet from the vector generation engine 611. The vector comparison engine 612 may be configured to access the database 603 to retrieve sets of known vectors of visual features and spatial orientations corresponding to known pallets. In some embodiments, the vector comparison engine 612 may be configured to retrieve only sets of known vectors corresponding to known pallets that meet certain criteria common with the pallet being analyzed (e.g., being used or active in the supply chain, in a certain region, at a certain facility, etc.). This may reduce the number of known vectors to which the pallet being analyzed needs to be compared, which may reduce processing time.

The vector comparison engine 612 may be configured to compare the received vectors to the known vectors to identify a matching set of known vectors and a corresponding matching pallet. In some embodiments, the vector comparison engine 612 may be configured to identify multiple potential matching pallets and provide a matching score, e.g., 95% of visual features are matching. The multiple potential matching pallets may be ranked from the highest matching score to the lowest matching score in some embodiments. The multiple potential matching pallets may further be ranked based on certain criteria common with the pallet being analyzed (e.g., if there are two 95% matches, the match with a cycle time closer to the cycle time of the pallet being analyzed may be ranked first). This ranking may include data from the supply chain expected to be associated with a pallet, such as where a matched pallet is expected to be located.

In some embodiments, a threshold matching score may be established for which a match may be identified. For example, the vector comparison engine 612 may only identify a match or matches having a matching score greater than or equal to 80%. If the matching score is below the threshold (e.g., under 80%), the vector comparison engine 612 may characterize the pallet being analyzed as a pallet that does not already exist in the database 603 (e.g., a new pallet or preexisting pallet that has not previously been analyzed and/or entered into the database 603, or a pallet that has changed visually). Thus, the vector comparison engine 612 may create a new entry in the database 603 for the pallet being analyzed. The entry may include a pallet identifier (e.g., a unique identification code, name or number corresponding to the pallet being analyzed) and the set of vectors generated by the vector generation engine 611. Thus, the next time the pallet is seen in the supply chain, it may be visually identified using the methods described herein.

The data generation engine 613 may be configured to, in conjunction with the processor 601, generate data associated with the pallet once the pallet has been identified and matched. The data may include, for example, location data (i.e., where the pallet was when its image was captured, e.g., at a particular shipper, carrier, manufacturer, and/or facility), whether the pallet is currently in the supply chain, a cycle time of the pallet to move through the supply chain, changes to the visual features on the pallet, new visual features on the pallet, damage to the pallet, combinations thereof, and/or the like. The data generation engine 613 may be configured to store the data as an entry in the database 603 corresponding to the matched pallet. The data generation engine 613 may be in communication with or may include one or more sensors, such as an accelerometer, a gyroscope, a barometer, a compass, a magnetometer, and/or the like.

The data generation engine 613 may additionally or alternatively be configured to, in conjunction with the processor 601, perform analysis based on identification of the pallet. For example, the data generation engine 613 may perform a detailed statistical analysis of cycle time at the individual pallet level, including information such as region, facility, customer, date, time, pallet type, pallet manufacturer, and/or other pallet characteristics. In another example, the data generation engine 613 may perform a detailed statistical analysis of pallet damage rate by region, facility, customer, date, time, damage type, pallet type, pallet manufacturer, and/or other pallet characteristics. In still another example, the data generation engine 613 may perform a detailed statistical analysis of known and unknown pallet paths through the pallet network of manufacturer, distributors, retailers, collectors, and/or service centers. In another example, the data generation engine 613 may monitor service center repair quality and efficiency. In still another example, the data generation engine 613 may make a periodic evaluation of identification accuracy to guide identification method refinement.

Methods for Pallet Identification

Figure 7:
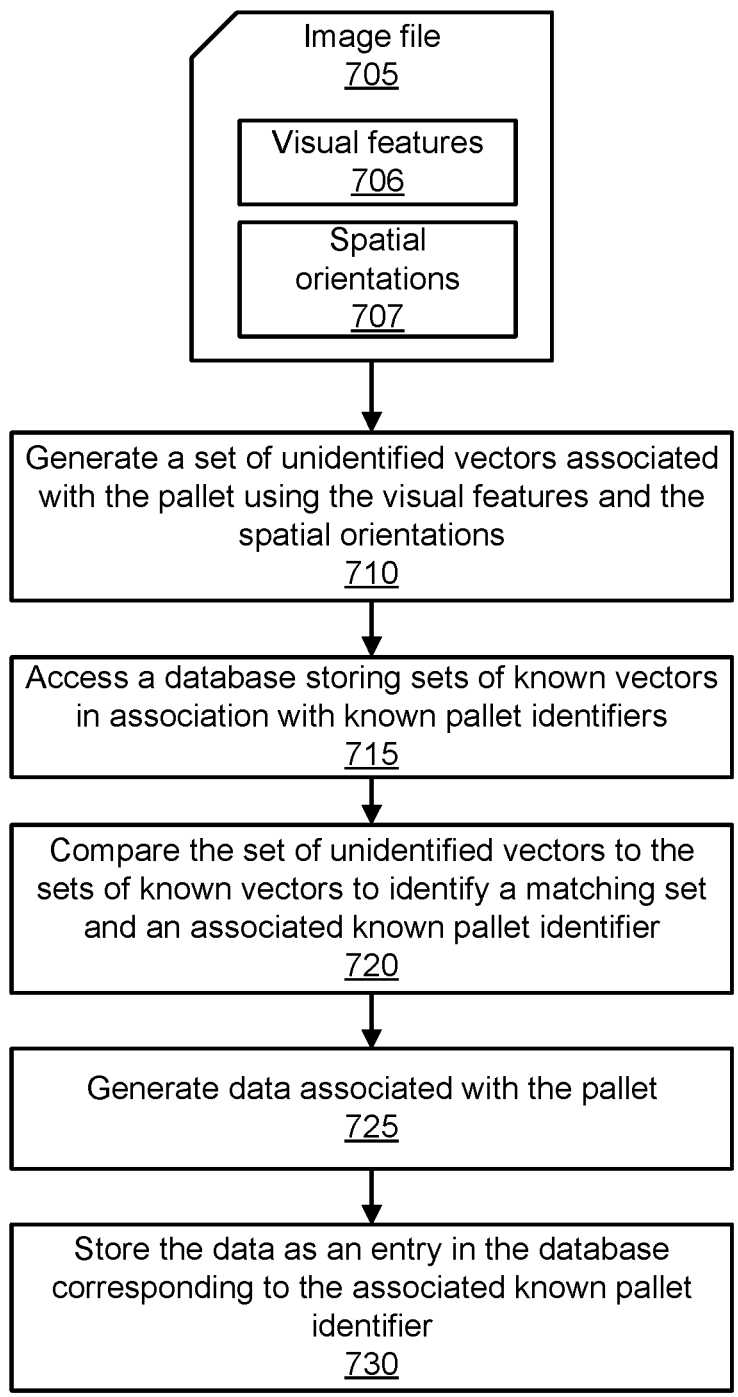
FIG. 7 is a flow chart illustrating a method for pallet identification, in accordance with some embodiments.

A variety of methods may be implemented by the above-described systems. FIG. 7 is a flow chart illustrating an exemplary method for pallet identification, in accordance with some embodiments. At process block 710, an image file 705 is received at a server computer located in a cloud. The image file 705 may depict a plurality of visual features 706 organized in a plurality of spatial orientations 707 on a pallet. In some embodiments, the pallet may not include a physical tag showing or storing a pallet identifier. In other words, the pallet may not have a direct visual or electronic means of providing its identity. In some embodiments, the pallet is wooden. The image file 705 may have been generated by an imaging device (e.g., a camera) located at a facility housing the pallet in a supply chain. In some embodiments, the imaging device may be or may be incorporated in a mobile device (e.g., a smartphone). The pallet may be included in a plurality of known pallets in the supply chain. In some embodiments, the image file 705 may be rotated, cropped, aligned and/or scaled. Further at process block 710, a set of unidentified vectors associated with the pallet may be generated using the plurality of visual features and the plurality of spatial orientations.

At process block 715, a database may be accessed. The database may store a plurality of sets of known vectors in association with a plurality of known pallet identifiers corresponding to the plurality of known pallets in the supply chain. Sets of vectors may have been generated for pallets in the supply chain based on the visual features and/or spatial orientations of those pallets, as described further herein. The pallet identifiers may include any combination of letters, numbers, and/or symbols that may be used to uniquely identify each pallet. In other words, each unique pallet may correspond to a unique pallet identifier.

At process block 720, the set of unidentified vectors may be compared to the plurality of sets of known vectors to identify a matching set of known vectors and an associated known pallet identifier. In some embodiments, comparing the set of unidentified vectors to the plurality of sets of known vectors may include identifying at least one difference between the set of unidentified vectors and the matching set of known vectors. The at least one difference may be indicative of changes to the pallet, e.g., new damage to the pallet, new markings on the pallet, etc. In some embodiments, the set of unidentified vectors may be compared to a subset of the plurality of sets of known vectors stored in the database (i.e., less than all of the sets of known vectors stored in the database). For example, the set of unidentified vectors may only be compared to sets of known vectors associated with pallets that are supposed to be in the same region as the pallet having the set of unidentified vectors. By narrowing down the number of sets of known vectors that the set of unidentified vectors are compared to, processing time may be reduced.

At process block 725, data associated with the pallet may be generated. In some embodiments, the data associated with the pallet may include a cycle time of the pallet to move through the supply chain. In some embodiments, the data associated with the pallet may include the at least one difference between the set of unidentified vectors and the matching set of known vectors (e.g., visual damage to the pallet). At process block 730, the data may be stored as an entry in the database corresponding to the associated known pallet identifier. In other words, data corresponding to the known pallet may be updated and/or added based on its identification in the supply chain.

Various advantages may be observed by implementing disclosed embodiments of the invention. For example, embodiments of the invention may be implemented with low cost hardware resources to capture images and low cost or free software resources to process and identify pallet images. In another example, embodiments of the invention may be efficient in that they do not require modification of existing pallet manufacturing processes or physical manipulation of the pallet structure. In another example, embodiments of the invention may be robust in that they can identify damaged pallets in situations that could cause a physical label to be lost. In still another example, embodiments of the invention may use mobile phone camera to enable pallet identification in any setting.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A computer-implemented method of identifying a pallet, the method comprising:
   receiving, at a computing device, an image captured by an imaging device, wherein the image depicts a visual feature and a corresponding spatial orientation associated with a pallet, wherein the spatial orientation comprises a distance between the visual feature and another visual feature or a fixed point on the pallet;
   accessing a database storing one or more known visual features with corresponding spatial orientations, each corresponding to a unique one of one or more known pallets associated with a supply chain;
   matching the visual feature and the corresponding spatial orientation associated with the pallet with a known visual feature and corresponding spatial orientation in the one or more known visual features with corresponding spatial orientations in the database to uniquely identify the pallet as a known pallet from the one or more known pallets associated with the supply chain; and
   storing data in the database for the known pallet.

2. The computer-implemented method of claim 1, wherein the pallet does not include a physical tag showing or storing a pallet identifier.

3. The computer-implemented method of claim 1, wherein the data comprises:
   location data indicating a location where the pallet is when the image is captured;
   changes to the visual feature on the pallet or new visual features on the pallet;
   a cycle time of the pallet to move through the supply chain;
   a statistical analysis of a pallet damage rate; or
   a statistical analysis of quality of repairs made to damage on the pallet.

4. The computer-implemented method of claim 1, further comprising generating a separate file from the image, wherein the separate file comprises:
   pixel coordinates of the visual feature in the image; and
   an angle orientation of the visual feature in the image.

5. The computer-implemented method of claim 1, wherein matching the visual feature and the corresponding spatial orientation associated with the pallet with the known visual feature and corresponding spatial orientation comprises:
   identifying a difference between the visual feature and the corresponding spatial orientation and the known visual feature and corresponding spatial orientation, wherein the data includes the difference.

6. The computer-implemented method of claim 5, wherein the difference is indicative of damage to the pallet.

7. The computer-implemented method of claim 1, wherein the pallet is located at a facility associated with a region, and wherein matching the visual feature and the corresponding spatial orientation associated with the pallet with the known visual feature and corresponding spatial orientation is based at least in part on matching the region.

8. A non-transitory computer-readable medium comprising instructions that, when executed by one or more processors, cause the one or more processors to perform operations comprising:
   receiving, at a computing device, an image captured by an imaging device, wherein the image depicts a visual feature and a corresponding spatial orientation associated with a pallet;
   accessing a database storing one or more known visual features with corresponding spatial orientations, each corresponding to a unique one of one or more known pallets associated with a supply chain;
   matching the visual feature and the corresponding spatial orientation associated with the pallet with a known visual feature and corresponding spatial orientation in the one or more known visual features with corresponding spatial orientations in the database to uniquely identify the pallet as a known pallet from the one or more known pallets associated with the supply chain, wherein the pallet is located at a facility associated with a region, and wherein matching the visual feature and the corresponding spatial orientation associated with the pallet with the known visual feature and corresponding spatial orientation is based at least in part on matching the region; and
   storing data in the database for the known pallet.

9. The non-transitory computer-readable medium of claim 8, wherein the imaging device comprises a mobile handheld computing device.

10. The non-transitory computer-readable medium of claim 8, wherein the operations further comprise rotating the image such that edges of the pallet are oriented in the image horizontally or vertically.

11. The non-transitory computer-readable medium of claim 8, wherein the operations further comprise, scaling the image such that a portion of the image depicting the pallet is a predetermined standard size.

12. The non-transitory computer-readable medium of claim 8, wherein the visual feature comprises a feature on a surface of the pallet.

13. The non-transitory computer-readable medium of claim 8, wherein the visual feature comprises wood grain marks or patterns on the surface of the pallet.

14. The non-transitory computer-readable medium of claim 8, wherein the visual feature comprises one or more selections from a group consisting of: holes, dents, textures, depressions, nail locations, and surface damage on the surface of the pallet.

15. A device comprising:
one or more processors; and
one or more memory devices comprising instructions that, when executed by the one or more processors, cause the one or more processors to perform operations comprising:
receiving, at a computing device, an image captured by an imaging device, wherein the image depicts a visual feature and a corresponding spatial orientation associated with a pallet;
generating a separate file from the image comprising pixel coordinates of the visual feature in the image, and an angle orientation of the visual feature in the image;
accessing a database storing one or more known visual features with corresponding spatial orientations, each corresponding to a unique one of one or more known pallets associated with a supply chain;
matching the visual feature and the corresponding spatial orientation associated with the pallet with a known visual feature and corresponding spatial orientation in the one or more known visual features with corresponding spatial orientations in the database to uniquely identify the pallet as a known pallet from the one or more known pallets associated with the supply chain; and
storing data in the database for the known pallet.

16. The device of claim 15, wherein the visual feature comprises dimensions of the pallet.

17. The device of claim 15, wherein the spatial orientation comprises a location of the visual feature on the pallet.

18. The device of claim 15, wherein the operations further comprise encoding the visual feature and the corresponding spatial orientation as a numerical vector.

19. The device of claim 15, wherein the spatial orientation comprises a distance between the visual feature and another visual feature or a fixed point on the pallet.

20. The device of claim 15, wherein the operations further comprise:
accessing a cycle time in the supply chain for the pallet;
accessing a plurality of known cycle times corresponding to one or more known pallets; and
matching the cycle time with a known cycle time in the plurality of known cycle times.

* * * * *